United States Patent [19]

Hori

[11] 4,231,562
[45] Nov. 4, 1980

[54] RECIRCULATING DOCUMENT FEEDER

[75] Inventor: Tatsu Hori, Los Altos, Calif.

[73] Assignee: Savin Corporation, Valhalla, N.Y.

[21] Appl. No.: 884,999

[22] Filed: Mar. 9, 1978

[51] Int. Cl.$^3$ .............................................. B65H 5/22
[52] U.S. Cl. .................... 271/3.1; 271/186; 271/213; 271/225; 271/DIG. 9
[58] Field of Search .................. 271/3.1, 64, 186, 225, 271/DIG. 9, 213, 279, 285; 355/64, 14; 414/54

[56] References Cited

U.S. PATENT DOCUMENTS

| | | | |
|---|---|---|---|
| 3,630,607 | 12/1971 | Korn | 271/213 X |
| 3,964,741 | 6/1976 | Kroeker | 271/213 |
| 4,076,408 | 2/1978 | Reid | 355/14 |
| 4,093,372 | 6/1978 | Guenther | 271/3.1 X |
| 4,158,500 | 6/1979 | DiFrancesco | 271/3.1 X |

OTHER PUBLICATIONS

IBM Technical Disclosure Bulletin, vol. 17, No. 8, Jan. 1975, "Stacking Technique", D. F. Manning et al., p. 2255.

Primary Examiner—Richard A. Schacher
Attorney, Agent, or Firm—Shenier & O'Connor

[57] ABSTRACT

Originals are individually separated from the bottom of a stack overlying the imaging platen of a document copier and are advanced around a first 180° bend onto the platen for copying. After they are copied, the originals are returned to the top of the stack around a second 180° bend at the other end of the platen. Each original is advanced to the imaging platen a number of times equal to the number of copies to be made to produce collated sets of copies from the copier. A relatively flat place-marking member initially placed on the uppermost original drops down when that original is fed to generate a signal indicating that the entire set of originals has been advanced once to the imaging platen. The generated signal indexes a counter that turns off the feeder when the desired number of copies have been made. This counter also actuates a motor that shifts the copy tray between sets to offset successive sets of copies.

18 Claims, 21 Drawing Figures

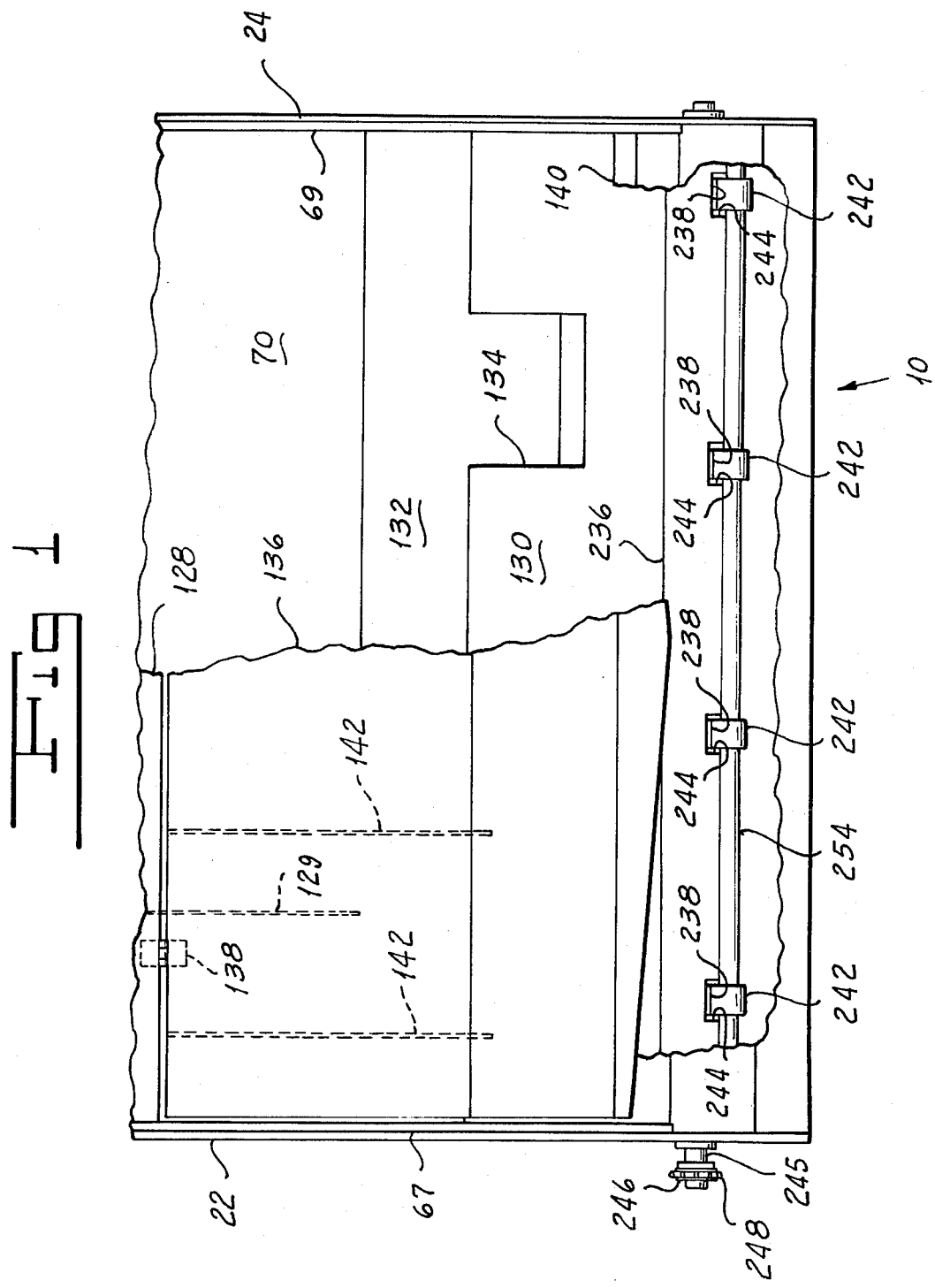

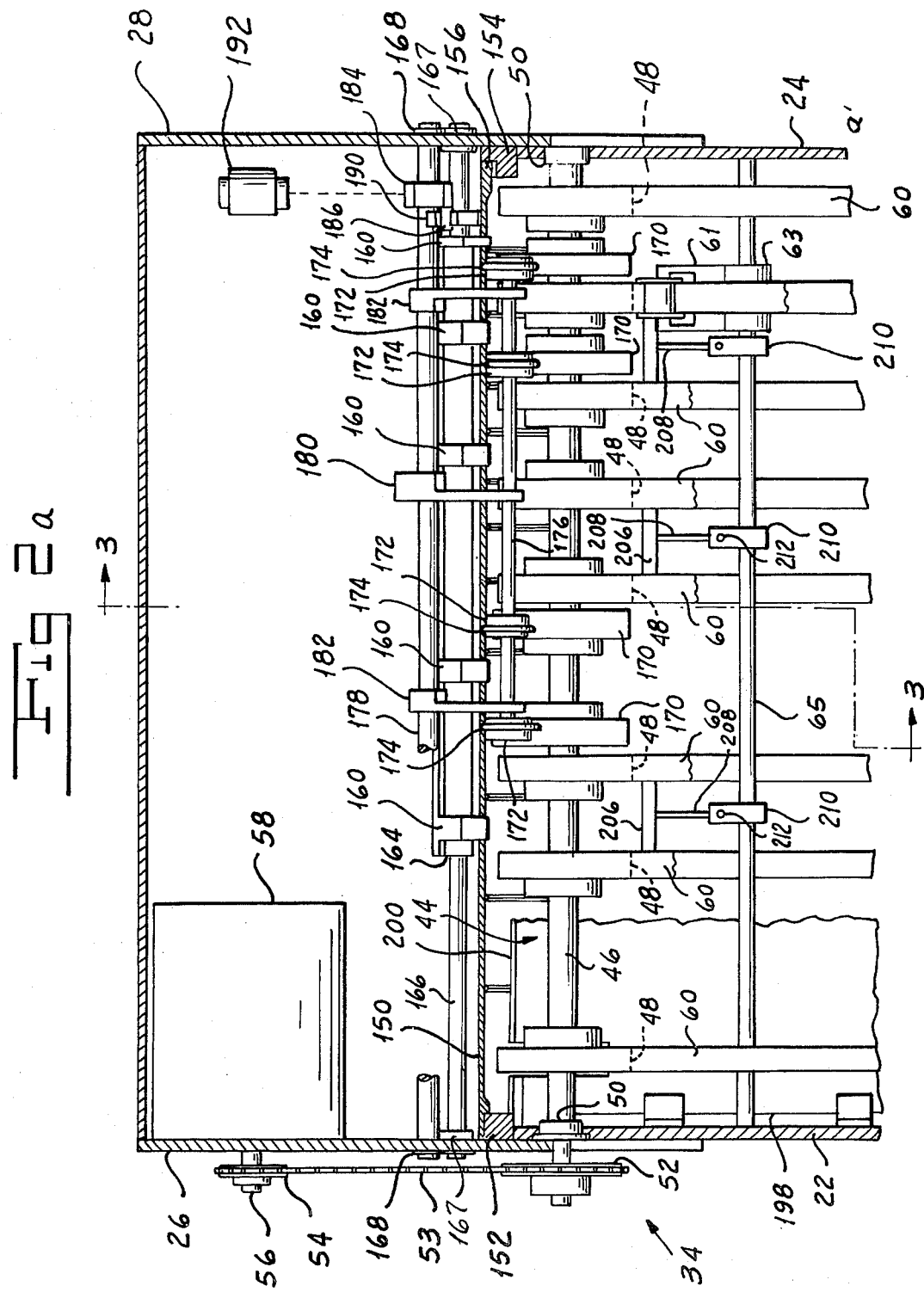

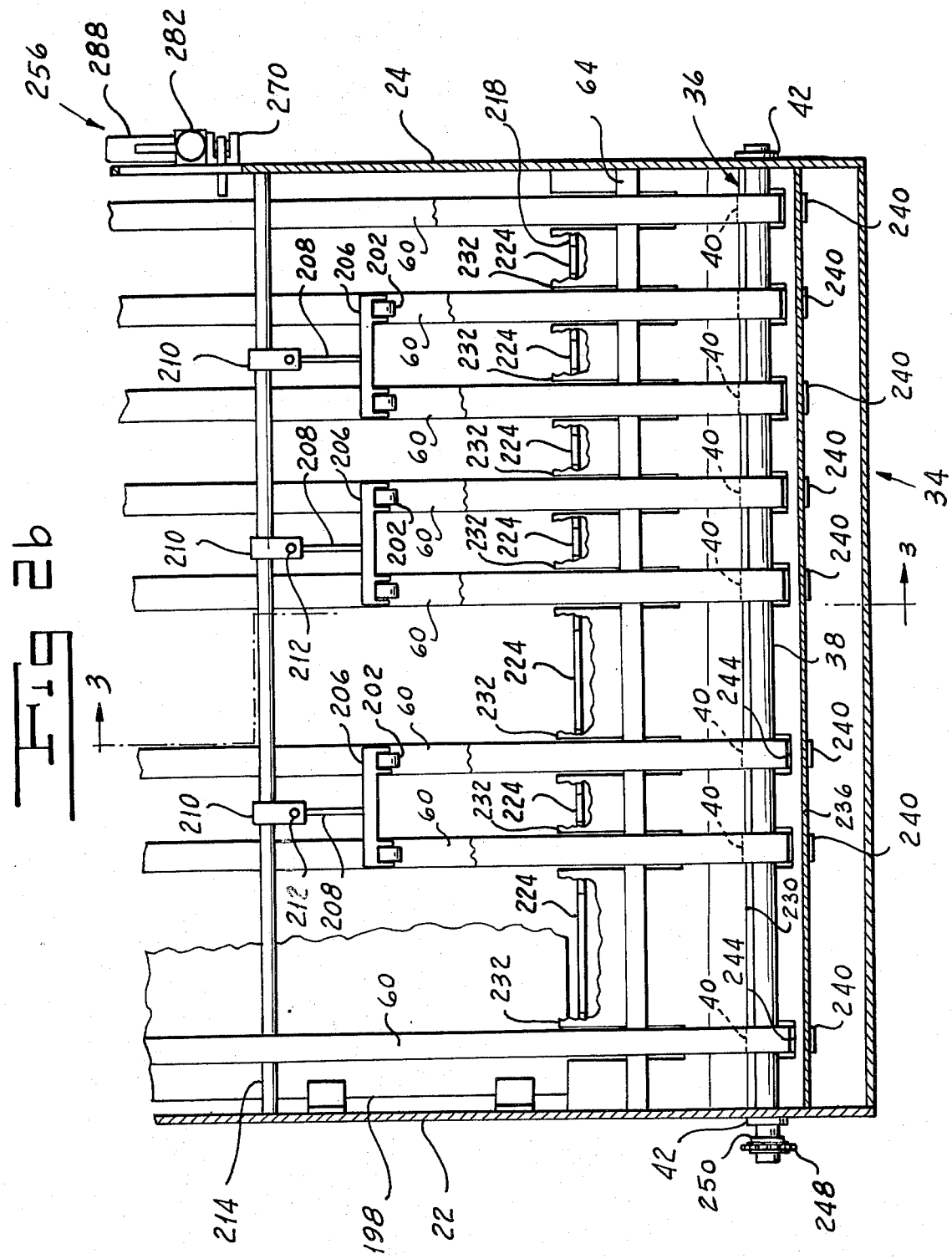

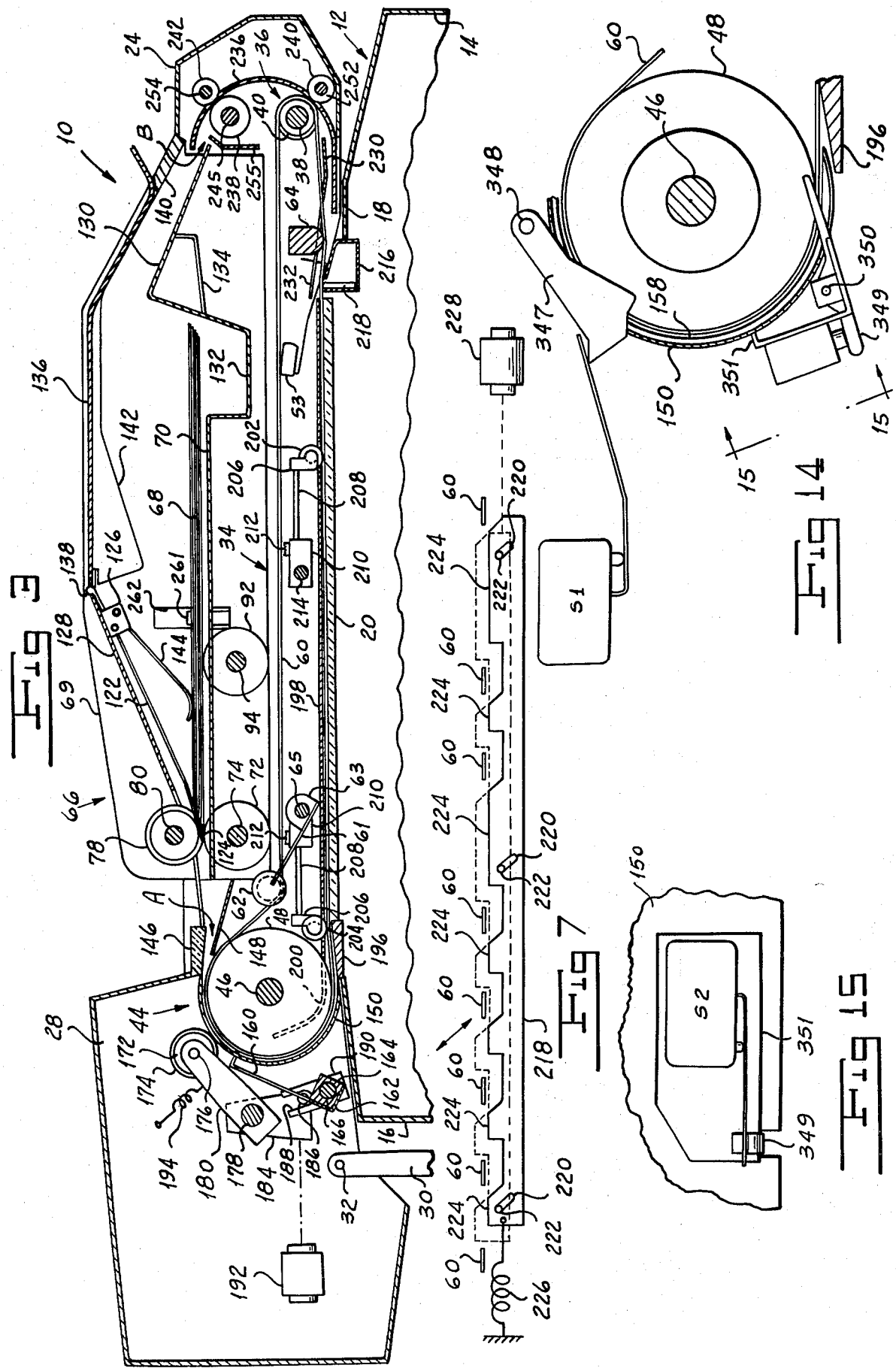

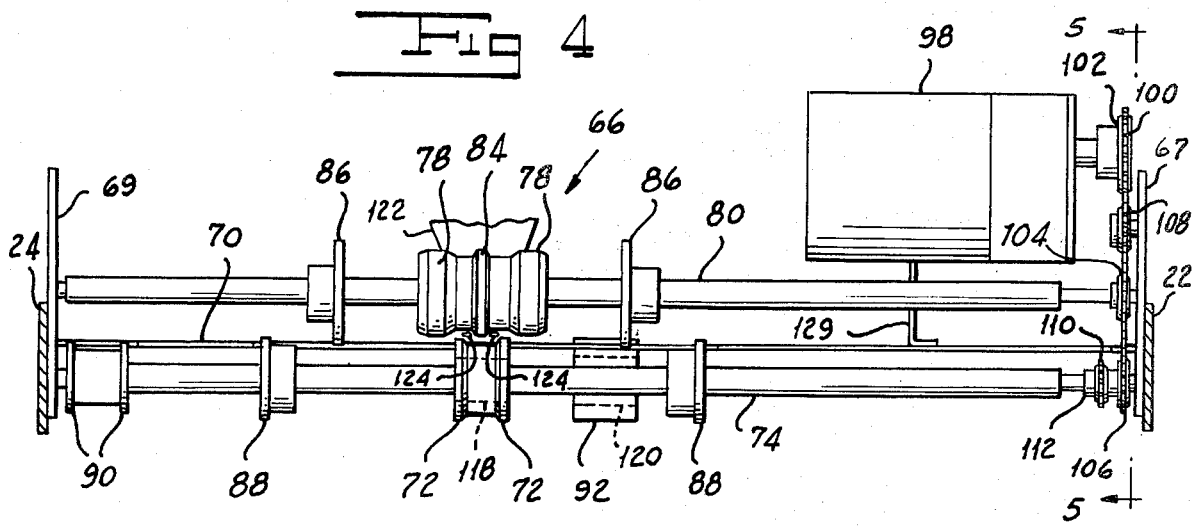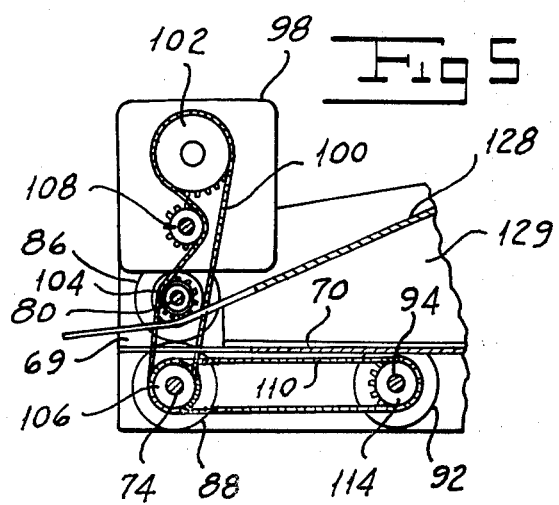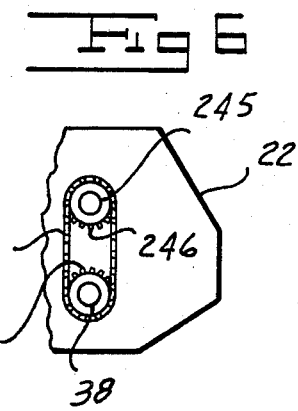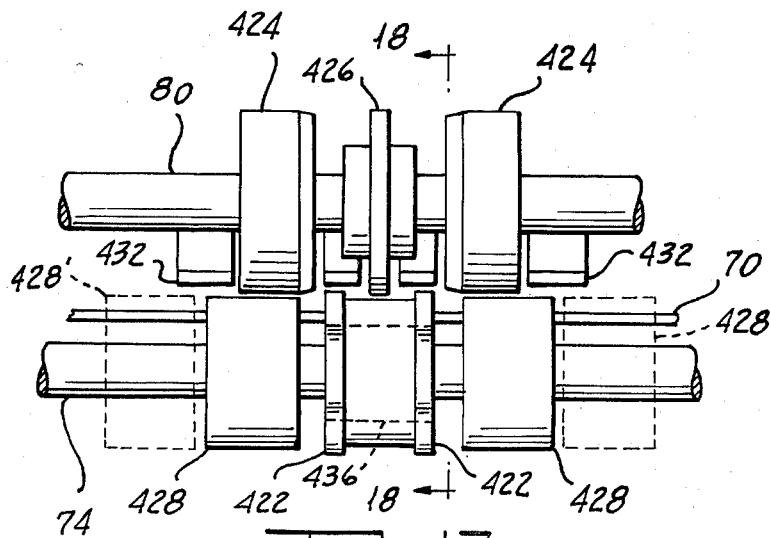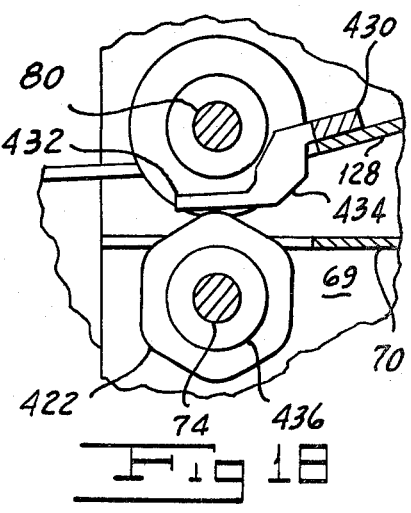

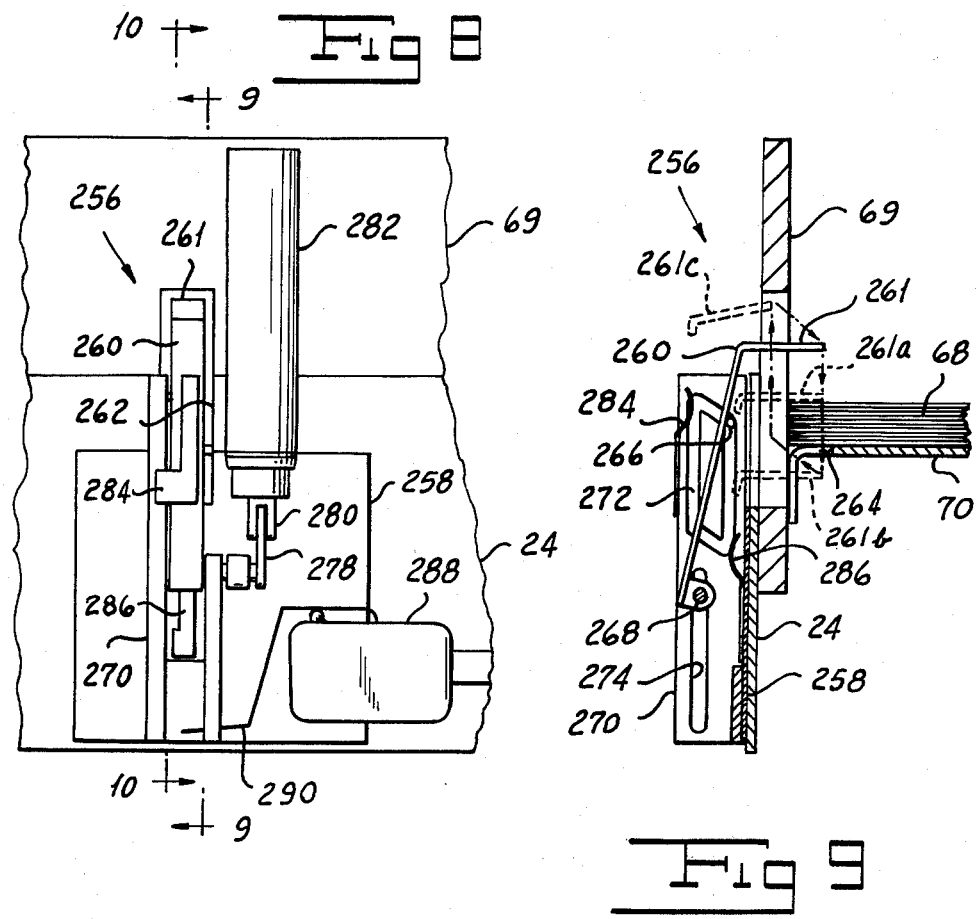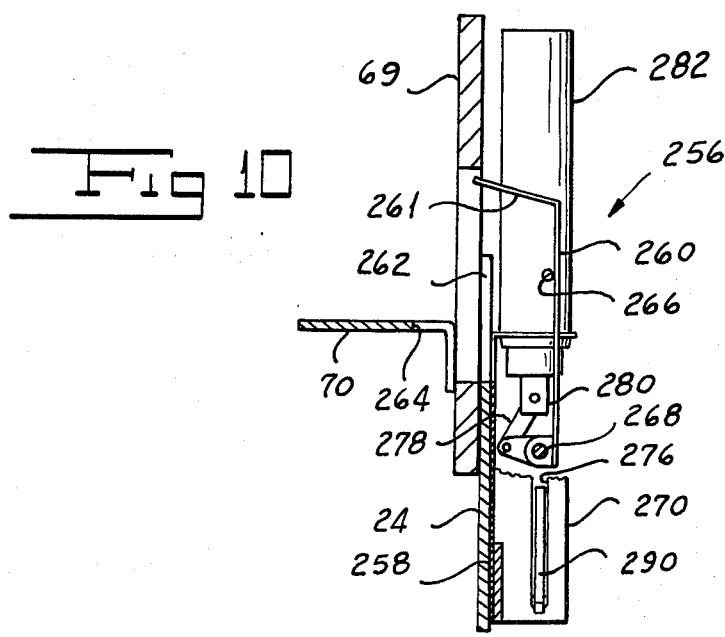

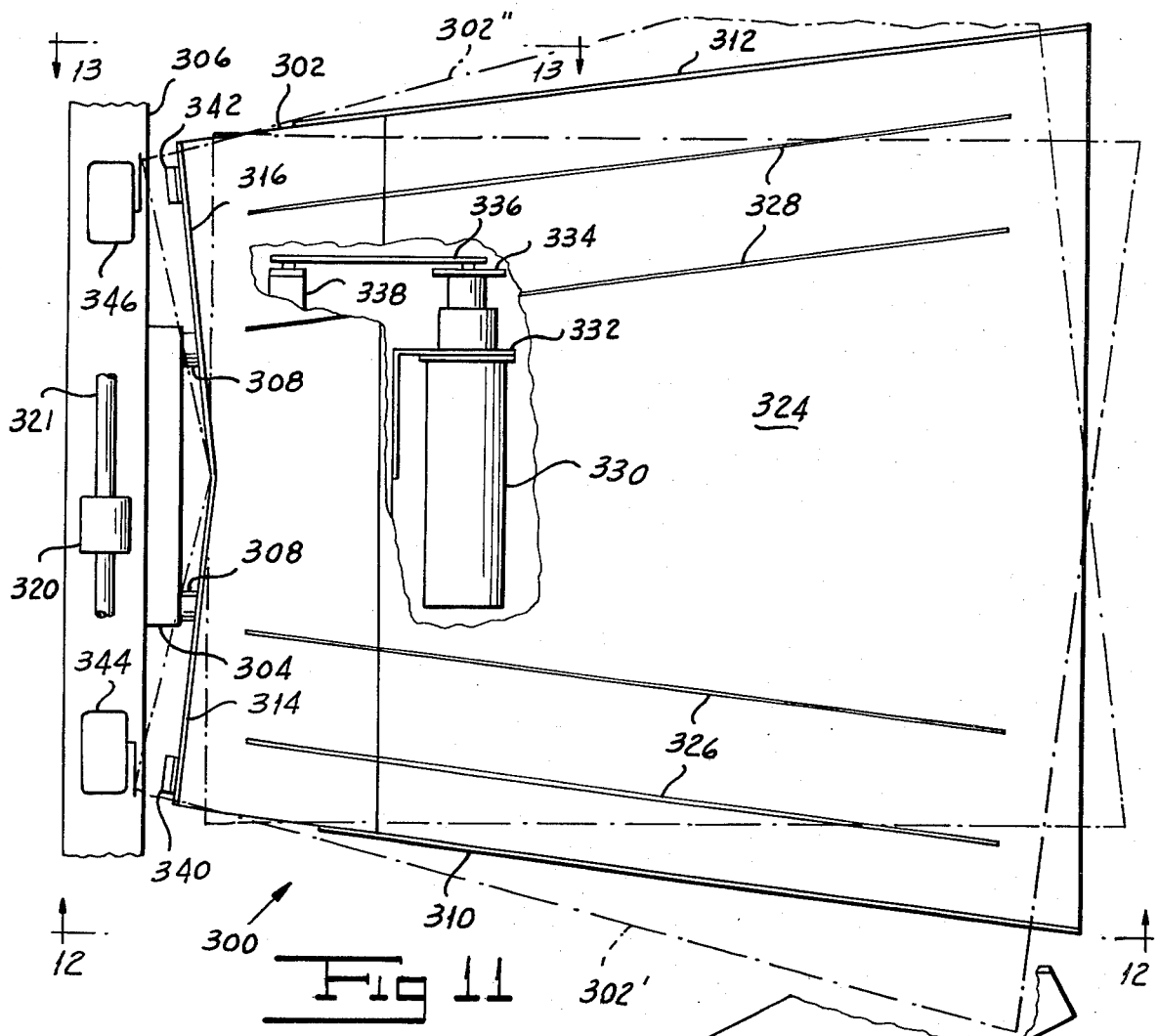
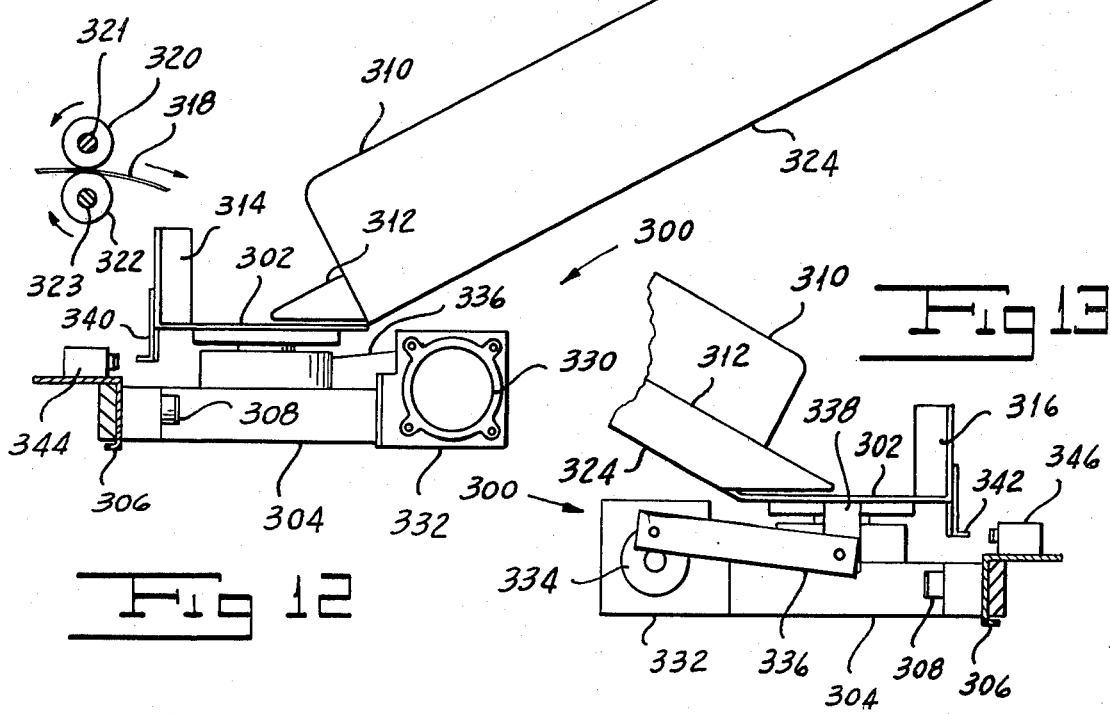

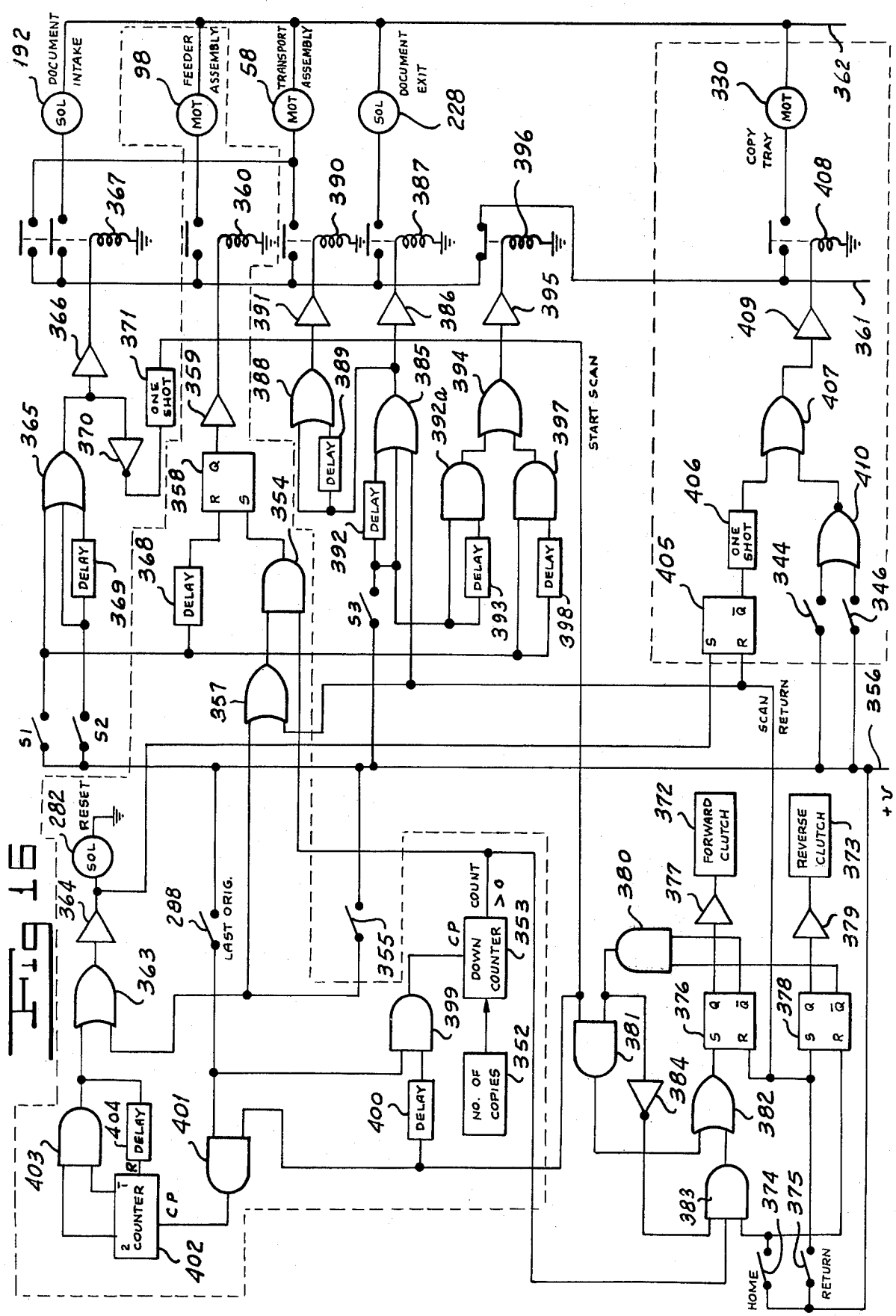

RECIRCULATING DOCUMENT FEEDER

BACKGROUND OF THE INVENTION

My invention relates to an automatic document feeder for document copiers and, more particularly, to an automatic feeder for an electrostatic copying machine.

Copiers provided with document feeders for making multiple sets of copies are known in the art. Generally, such feeders are operated so as to transport each of the originals once to a copying station and make the required numbers of copies of each such original in immediate succession. The copies produced when the feeders are operated in this fashion are thus uncollated and must be sorted either manually or by elaborate arrangements of multiple bins or the like. One such feeder of this type, operating semiautomatically, is shown and described in U.S. Pat. No. 4,023,791, issued to applicant T. Hori, K. W. Gardiner and N. F. Mangal.

U.S. Pat. Re. No. 27,976, issued to L. W. Sahley, describes a document feeder that advances an original from the bottom of a first stack in a first supply station to a copying station at which it is scanned, and then delivers the original to the top of a second stack at a second supply station. To make a second set of copies, the originals are advanced from the bottom of the second stack to the copying station, and then delivered to the top of the first stack. The process is then repeated a sufficient number of times to make the desired number of copies. While this arrangement results in automatically collated sets of copies, it effectively requires an additional document supply station with its added bulk and expense. Further, the patentee fails to describe a completely satisfactory means for identifying and separating collated sets of pages. While the patentee suggests that blank marker pages be made at the end of each set, the operator would still have to examine the copy stack carefully simply to find the marker pages.

The patentee also suggests that one of the supply stations may be eliminated by supplying an original from the bottom of the stack of one supply station and then returning the original to the top of the same stack. To accomplish this, however, one must alternatingly shift either a gate or a tray between an advance and a return position. Since, as the patentee concedes, it is not possible to return a first original to the stack while simultaneously advancing a second original to the imaging station, this mode of operation is twice as slow as the mode of operation using two supply stations.

German Pat. No. 1,128,295, issued to H. Rankers, discloses a device for making blueprints in which originals fed individually from the bottom of an original tray are aligned with sheets of blueprint paper and are then moved together in superposed relationship through an exposure station with exposure taking place as the original and the copy material move through the station. After exposure, the originals are separated from the sheets of blueprint paper and returned to the top of the original bin along a return path separate from the path along which the originals are advance.

The same patentee also suggests, in German Pat. No. 1,156,314, that the number of times each original is advanced to the exposure station can be automatically controlled by bonding an opaque or metallized foil strip to the initially uppermost original and sensing its advance from the bottom of the stack. This is a relatively inconvenient method for determining how many sets of copies have been made.

U.S. Pat. No. 3,941,376, issued to K. E. Liechty et al, discloses a recirculating document feeder using a place-marking member to follow the progress of a given sheet toward the feed side of the stack. When the sheet is returned to the other side of the stack, a clutch is actuated to couple the place-marking member to a rotating shaft, moving the member along a rectangular path and repositioning it against the sheet. While such a place-marking member obviates the need for metal separator sheets, electrodes or the like, which can be sensed, the rotating shaft and the necessary linkage result in a relatively complicated construction.

SUMMARY OF THE INVENTION

One of the objects of my invention is to provide a document feeder for a document copier which results in automatically collated multiple sets of copies.

Another object of my invention is to provide a document feeder having only a single original document supply station.

Another object of my invention is to provide a document feeder which advances a second original to an imaging or exposure station of a copier while simultaneously removing a first original from that station.

Still another object of my invention is to provide a document feeder having a relatively rapid recycling rate.

A further object of my invention is to provide a document feeder which is especially adapted for use with a copier having moving optics for scanning a stationary original.

Yet another object of my invention is to provide a document feeder which automatically feeds originals to the copier a preset number of times.

Still another object of my invention is to provide a document feeder which does not require the insertion or attachment of place-marking sheets.

Another object of my invention is to provide a document copier which permits the ready identification and separation of multiple sets of copies.

Other and further objects of my invention will be apparent from the following disclosure.

In general, my invention contemplates a document feeder for a document copier having a transparent imaging platen on which originals are stationarily positioned for scanning by moving optics in which a support surface spaced above the imaging platen in parallel relationship and generally registering therewith receives a stack of originals to be copied. My feeder includes a separator for removing an original from one side of the stack and for advancing it from one end of the stack to a conveyor which transports the separated original along a first curved path between the one end of the stack and the adjacent end of said imaging platen and thence onto the imaging platen in position for copying. After the original has been held stationary for a period of time to permit exposure a return transport carries the original along a second curved path between the other end of the imaging platen and the adjacent end of the support surface and returns the original to the other side of the stack.

By providing a support surface in parallel relationship to and generally in registry with the imaging platen, I have provided a document feeder having only a single supply station and in which the distance between the supply station and the imaging platen is relatively short and is substantially the same both on the advance, or feed path, and the return path. My document feeder is thus especially suitable for a copier that stops originals for scanning, since the geometry of the feeder facilitates the advance of a second original to the imaging platen and simultaneous removal of a first original from the platen and return to the support surface. Because of this special suitability for synchronous operation, my document feeder allows a relatively rapid recycling rate with only a single supply station. My feeder includes a place marker resetting means which is less complicated and hence less expensive and more reliable than are resetting means of the prior art.

Still another aspect of my invention contemplates a document copier comprising copying means for successively making a plurality of sets of copies of a single set of ordered originals, each of the sets of copies being arranged in an order corresponding to that of a set of originals, a stacking surface for receiving successive copies made by the copying means, and means for shifting in position of the stacking surface to offset successive sets of copies relative to one another to permit the ready identification and separation thereof.

BRIEF DESCRIPTION OF THE DRAWINGS

In the accompanying drawings to which reference is made in the instant specification and in which like reference characters are used to indicate like parts in the various views:

FIG. 1 is a fragmentary top plan of the front portion of my automatic feeder with parts broken away.

FIG. 2a is a fragmentary top plan of the front portion of the transport assembly of my automatic feeder with parts broken away and with other parts shown in section.

FIG. 2b is a fragmentary top plan of the rear portion of the transport assembly of my automatic feeder with parts broken away and with other parts shown in section.

FIG. 3 is a section of my automatic feeder, taken along line 3—3 of FIGS. 2a and 2b.

FIG. 4 is a rear elevation of the feeder assembly shown in FIGS. 1 to 3.

FIG. 5 is a fragmentary left side elevation of a portion of the drive train of the feeder shown in FIGS. 1 to 3.

FIG. 6 is a fragmentary left side elevation of another portion of the drive train of the feeder shown in FIGS. 1 to 3.

FIG. 7 is a rear elevation of the exit gate of the feeder shown in FIGS. 1 to 3.

FIG. 8 is a fragmentary right side elevation of the end-of-stack sensor of the feeder shown in FIGS. 1 to 3.

FIG. 9 is a fragmentary section of the end-of-stack sensor, taken along line 9—9 of FIG. 8.

FIG. 10 is a fragmentary section of the end-of-stack sensor, taken along line 10—10 of FIG. 8.

FIG. 11 is a fragmentary top plan of the copy tray of the copier associated with the feeder shown in FIGS. 1 to 3.

FIG. 12 is a fragmentary section of the copy tray shown in FIG. 11, taken along line 12—12.

FIG. 13 is a fragmentary section of the copy tray shown in FIG. 11, taken along line 13—13.

FIG. 14 is an enlarged fragmentary section showing one of the sheet sensing switches of the feeder shown in FIGS. 1 to 3.

FIG. 15 is an enlarged fragmentary section showing another of the sheet sensing switches of the feeder shown in FIGS. 1 to 3.

FIG. 16 is a schematic diagram of an exemplary control circuit for the feeder shown in FIGS. 1 to 3.

FIG. 17 is an enlarged fragmentary rear elevation showing an alternative feeder assembly for the feeder shown in FIGS. 1 to 3.

FIG. 18 is a fragmentary section of the alternative assembly shown in FIG. 17, taken along line 18—18.

DETAILED DESCRIPTION OF THE PREFERRED EMBODIMENTS

Figure 19:
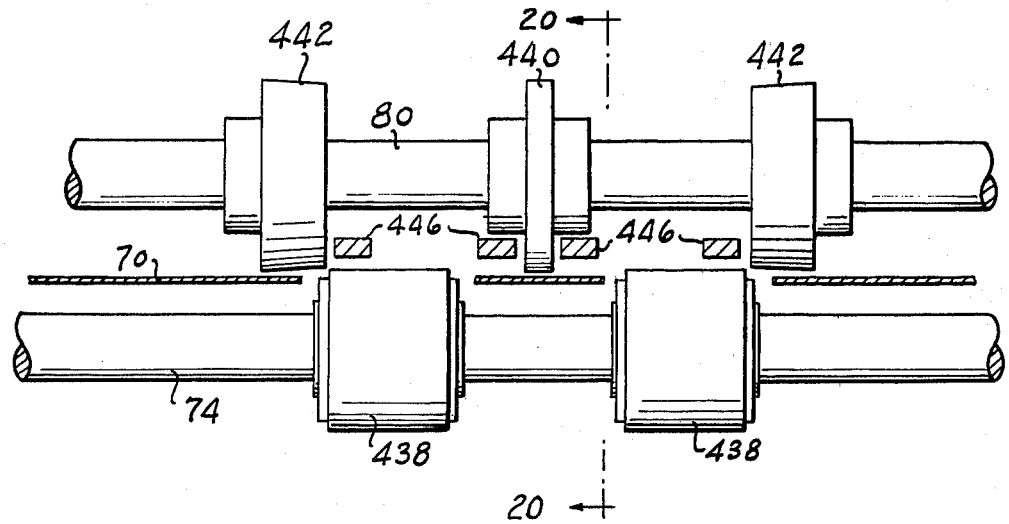
FIG. 19 is a fragmentary section of another alternative feeder assembly, taken along line 19—19 of FIG. 20.

Referring now to FIGS. 1–10, my document feeder, indicated generally by the reference character 10, rests upon an electrostatic copier, indicated generally by the reference character 12, having a front wall 14, a rear wall 16, and an upper wall 18 supporting a transparent imaging platen 20. The copier 12 is of the type in which an original is aligned with its side edge against the front edge of the imaging platen 20 and with its top or bottom edge against the right edge of the platen. Copiers having a left-edge alignment may be accommodated by simply reversing the parts of the feeder 10. The feeder frame includes a left side plate 22 and a right side plate 24 extending generally along the sides of the copier 12. A pair of left and right rear side plates 26 and 28 are secured to the rear portions of the plates 22 and 24. Brackets 30 on the copier 12 carry pivot pins 32 extending into rear side plates 26 and 28 to permit the entire feeder to be swung away from the imaging platen 20 to permit thick originals such as books to be copied. Suitable limit stops (not shown) define a lower limit position in which the feeder 10 is slightly spaced from the copier 12 as shown.

The transport assembly of my feeder 10, indicated generally by the reference character 34, includes a front pulley assembly, indicated generally by the reference character 36. Pulley assembly 36 comprises a shaft 38 and a plurality of pulleys 40 mounted on the shaft 38 at spaced locations therealong. Bearings 42 received in left and right side plates 22 and 24 in front of platen 20 support shaft 38 for rotation. A rear pulley assembly, indicated generally by the reference character 44, includes a shaft 46 and a plurality of pulleys 48 mounted at spaced locations on the shaft 46. Bearings 50 received in left and right side plates 22 and 24 behind the imaging platen 20 rotatably support shaft 46. The left end of shaft 46 extends beyond side plate 22 to receive a sprocket wheel 52. A pitch chain 53 driven by sprocket wheel 54 on the shaft 56 of a motor 58 mounted on the inner wall of left rear side plate 26 drives wheel 52.

A plurality of transport belts 60 are supported between respective pulleys of the front and rear pulley assemblies 36 and 44 to form a conveyor loop. Preferably, the belts of the conveyor loop are approximately ½ inch wide by 1/64 inch thick and are made of cloth-based neoprene or of cloth-based synthetic rubber sold by E.I. duPont de Nemours & Co. under the trademark "Hypalon". A plurality of flanged tension pulleys 62 provide belts 60 with a suitable amount of tension. Tension pulleys 62 are rotatably supported at ends of resilient metal strips 61, the other ends of which are secured by clamps 63 to a transversely disposed supporting rod 65. A rounded guide bar 64 disposed transversely between the front edge of the platen 20 and the pulley assembly 36 diverts portions of the belts 60 slightly below the level of the platen 20.

An automatic original removal and delivery assembly, indicated generally by the reference numeral 66, delivers originals individually to the transport belts 60. A stack of originals 68 to be copied rests on a support surface 70 with the originals arranged face up with their top or bottom edges parallel to side plates 22 and 24. Support surface 70 extends transversely between left and right feeder assembly side plates 67 and 69, which fit inside side plates 26 and 28. Plates 67 and 69 support the various components of the assembly 66 and may, if desired, be removably attached to the side plates 22 and 24 to permit the substitution of a semiautomatic feeder module, for example.

A pair of feed rollers 72, formed of a suitable high-friction material such as polyurethane, are supported on a shaft 74 disposed transversely below the rear edge of support surface 70. Rollers 72 are driven in a counterclockwise direction, as seen as FIG. 3, to move the lowermost original of the stack 68 to the left, as viewed in the FIGURE. Shaft 74 is rotatably supported by side plates 67 and 69 and is disposed in such a manner that the feed rollers 72 extend slightly above the support surface 70. A pair of retarding rollers 78, formed of a somewhat lower-friction material, such as silicone rubber, and other than the polyurethane of which rollers 72 are formed, are supported on a shaft 80 disposed above the shaft 74. Rollers 78 are driven in a counterclockwise direction, as seen in FIG. 3, to exert an oppositely directed force on the stack 68 to prevent the passage of all except the lowermost original past the rollers 72 and 78. Retarding rollers 78, which have a somewhat wider working surface than do the feed rollers 72, are disposed outwardly with respect to the feed rollers 72 in a manner shown in FIGS. 4 and 5. The upper shaft 80 is rotatably supported by side plates 67 and 69 and is disposed such that the retarding rollers 78 intermesh slightly with the feed rollers 72. Preferably, the radial overlap of the rollers 72 and 78 ranges between 0 and 0.004 inch. In the embodiment shown, the rollers, 72 and 78 also overlap axially slightly, the edges of the peripheral portions of the rollers 78 being beveled to provide clearance for the sheets of paper.

To "scallop" the originals and provide a more effective contact between the originals and the rollers 72 and 78, I provide a plurality of guide rollers on the upper shaft 80. Specifically, I provide a center guide roller 84 on shaft 80 between the feed rollers 72 and, in addition, a pair of outer guide rollers 86 on shaft 80 outside of the retarding rollers 78. Rollers 84 and 86 are formed of any suitable low-friction plastic or other material, such as the polytetrafluoroethylene plastics sold by E.I. DuPont de Nemours & Co. under the trademarks "Delrin", "Lucite", or "Teflon". Preferably, the coefficient of friction between the rollers 84 and 86 and the originals is less than that between adjacent originals in the stack 68. As is seen more clearly in FIG. 4, guide rollers 84 and 86 scallop or corrugate the originals within the space formed by rollers 72 and 78, thus providing an effective frictional contact with each of these rollers. Outer guide rollers 86 also prevent the top and bottom edges of the original being fed from bending upwardly. Preferably, guide rollers 86 are movable axially along the shaft 80 to adjust the retarding force exerted by the retarding rollers 78. I provide an additional pair of guide rollers 88 on the lower shaft 74 and, finally, a pair of end rollers 90 on the left end of shaft 74, as seen in FIG. 4.

An auxiliary feed roller 92, formed of a high-friction material such as polyurethane, is supported on a shaft 94 disposed beneath the support surface 70 parallel with the shaft 74 and at a location at which it engages the lowermost original at a point intermediate the ends thereof. Shaft 94, rotatably supported by side plates 67 and 69, is driven in a counterclockwise direction, as seen in FIG. 3, to provide an additional driving force to the lowermost original of the stack 68. I drive shafts 74, 80 and 94 with a motor 98 mounted by any suitable means (not shown) above the support surface 70. A drive chain 100 couples a sprocket wheel carried by the shaft of motor 98 to sprocket wheels 104 and 106 carried respectively by shafts 80 and 74. An idler sprocket wheel 108 disposed between sprocket wheels 102 and 104 urges the chain 100 into more positive engagement with sprocket wheel 104. An auxiliary drive chain 110 couples respective sprocket wheels 112 and 114 carried by shafts 74 and 94. Respective one-way clutches 118 and 120 couple feed rollers 72 and 92 to shafts 74 and 94 to permit freewheeling rotation in a counterclockwise direction as seen in FIG. 3.

To prevent originals in the stack 68 from piling up against the retarding rollers 78, I dispose a guide strip 122, formed of a suitable metal or low-friction plastic such as Teflon, in such a manner that a pair of spaced fingers 124 at the lower end of the strip 122 extend between the shafts 74 and 80 in the region between the guide roller 84 and the retarding rollers 78. Brackets 126 attached to a fixed cover 128 support guide strip 122. Fixed cover 128, disposed between side plates 67 and 69, converges with the support surface 70 toward the end thereof from which originals are removed. An extension on the lower end of cover 128 leads to a guide 146 which, together with a lower guide 148, forms an entry indicated generally by the arrow A into which originals are delivered by the assembly 66. An upstanding guide wall 129 disposed 11 to 12 inches from side plate 69 laterally confines the originals in the stack 68.

I form the support surface 70 with an upwardly inclined ramp 130 at the end remote from the feed end. Ramp 130 guides originals discharged from an outlet B, to be described, upwardly to fall on top of the stack 68. The upper portion of the ramp 130 is disposed above the horizontal portion of the support surface 70 for this purpose. I also form the support surface 70 with a transversely extending trough 132 between the ramp 130 and the horizontal portions to facilitate insertion of the fingers to remove the stack of originals 68. A cutout 134 formed in the upper part of the ramp portion further facilitates removal. A movable cover 136 secured to the fixed cover 128 by hinges 138 guides originals moving up the ramp portion 130 onto the stack 68. The free end of the cover 136 normally rests against a transverse lip or abutment 140 disposed along the outlet B above the lower part of the ramp 130. To insert or remove originals from the stack 68, the operator simply lifts the cover 136. A plurality of longitudinal ribs 142 on the underside of the hinged cover 136 guide the originals downwardly into the stack 68 as they are discharged from the outlet B. Ribs 142 also prevent the originals from directly rubbing against the underside of the cover 136 and generating an electrostatic charge. A metal arm 144 which is pivotally supported on brackets 126 brakes the incoming originals as they are fed to the stack 68. Preferably, the arm 144 is about ¾ inch wide and 1/32 inch thick.

When an original is to be copied, motor 98 is energized to drive feed rollers 72 and 92 to separate the lowermost original from the stack 68 and advance it through the inlet A formed by upper and lower guides 146 and 148. The original is then directed around the pulley assembly 44 along a transport path defined by a cylindrical guide 150. Guide 150 extends between left and right end collars 152 and 154 secured to the left and right rear side plates 26 and 28, respectively. The right end collar 154 is provided with a circumferential sheet-receiving groove 156 flush with the inner wall of right side plate 69. The cylinder guide 150 is preferably formed with a plurality of circumferential ribs 158 on its inner surface to minimize skewing of the original.

A plurality of fingers 160 are selectively moved through suitable openings in cylindrical guide 150 and across the transport path defined by the guide 150 to prevent the original from moving past a predetermined point on said path. Fingers 160 are preferably stamped or are otherwis formed from a single sheet 162 of metal or other material. I secure this member to a metal support 164 carried by a shaft 166. Bearings 167 mounted in plates 26 and 28 rotatably receive shaft 166 to permit a pivotal movement of the fingers into and out of the sheet transport path.

A plurality of drive rollers 170, mounted on the second pulley assembly shaft 46 at spaced locations from its right end as viewed in FIG. 2a and having the same diameter as rollers 48 (taking into account here the thickness of the belts 60), assist in driving an original around the transport path defined by cylindrical guide 150. Rollers 170 preferably comprise a suitable low-friction material such as Delrin. Rollers 170 cooperate with a plurality of pressure rollers 172 preferably having a somewhat smaller diameter and provided with rubber tires 174 to provide high-friction working surfaces. I mount pressure rollers 172 on a shaft 176 for common rotation at spaced locations corresponding to the locations of rollers 170. A shaft 178 supported by bearings 168 received by side plates 26 and 28 carries a central actuating arm 180 for rotation therewith. I provide the end of arm 180 remote from shaft 178 with a relatively thin ball bearing which rotatably receives the shaft 176 in such a way as to permit shaft 176 to swivel slightly about its center to equalize the pressure with which rollers 172 engage rollers 170. Preferably, the assembly includes end stabilizer arms 182 relatively loosely received by shafts 178 and 176. It will be appreciated that shaft 178 and arm 180 support the pressure roller assembly for swinging movement toward and away from the drive rollers 170. Shafts 176 and 178 and arms 180 and 182 are disposed in such a manner as to permit pressure rollers 172 to engage drive rollers 170 along a line between the inlet A and the stop fingers 160. Cylindrical guide 150 is provided with suitable slots to permit engagement of the pairs of rollers 170 and 172.

The pivot shaft 178 carries a crank plate 184 provided with a crank pin 186. The stop finger shaft 166 carries an arm 190 having a slot 188 formed in its end for receiving pin 186. Pivot arm shaft 178 is thus coupled to stop finger shaft 166 in such a manner that movement of the pressure rollers 172 into engagement with the drive rollers 170 is accompanied by a movement of the stop fingers 160 away from the transport path defined by the cylindrical guide 150. The armature of a solenoid 192 is connected by a suitable linkage (not shown) to crank plate 184 to rotate shaft 178 in a clockwise direction (as seen in FIG. 3) against the action of a spring 194 when the solenoid is energized. Normally, the spring 194 maintains the above-described inlet assembly in a disengaged position, shown in FIG. 3, in which the pressure rollers 172 are disengaged from the drive rollers 170 and originals are prevented from moving further along the transport path by fingers 160. When the inlet assembly is in such a disengaged position, motor 98 may be energized to advance an original through the inlet A.

The feeder assembly 66 continues to advance the original along the transport path until its leading edge is beyond the pressure rollers 172. At this point, motor 98 is disabled and motor 58 is actuated to drive the transport belts 60. Simultaneously with the actuation of motor 58, solenoid 192 is actuated to pull the lower end of the crank plate 184 toward the rear of the feeder, thereby moving fingers 160 away from the transport path and moving pressure rollers 172 into engagement with drive rollers 170 to propel the sheet along the transport path. The freewheeling construction of feeder assembly feed rollers 72 and 92 readily permits the transport assembly 34 to pull the trailing portion of the fed original from the feeder assembly 66. Preferably, to prevent possible jamming, the linear speed of the transport belts 60 (about 1 meter per second) should be somewhat greater than that of the feed rollers 72 and 92.

Upon emerging from the lower end of the cylindrical guide 150, the original follows a path defined from below by the imaging platen 20 and rear edge plate 196 and from above by a guide plate 198 mounted between side plates 22 and 24 in parallel closely spaced relationship with the imaging platen 20. Guide plate 198 extends over the imaging platen 20 and edge plate 196 and has a plurality of fingers 200 extending generally upwardly and rearwardly between drive rollers 170 and pulleys 48 to minimize the possibility of the original being fed to the upper side of the guide plate 198.

Respective front and rear pressure rollers 202 and 204 disposed above the inner belts 60 maintain the original in a close contacting relationship with the imaging platen 20 as the original advances across the platen's upper surface. I rotatably mount each of the rollers 202 and 204 in a roller support 206 carried by a rod 208 extending from a block 210. A shaft 214 transversely arranged between side plates 22 and 24 rotatably supports the front roller blocks, while shaft 65 supports the rear roller blocks. Rollers 202 and 204 are thus biased against the belts 60 by the weight of the roller supports 206. If desired, weights may be added to these supports to increase the downward force. Rods 208 are loosely retained by screws 212 within blocks 210 to help equalize the force on adjacent belts. I provide guide plate 198 with holes at the appropriate locations to permit pressure rollers 202 and 204 to contact the belts 60.

A housing 216 in front of platen 20 receives a gate 218 which may be moved into the transport path followed by the original to stop it for copying. I mount gate 218 for movement laterally and upwardly with respect to the front edge of the platen to permit the actuator to be located at one of the ends of the gate. Preferably, this mounting is accomplished by providing the gate 218 with a plurality of slots 220 spaced along its length. I form slots 220 at an acute angle to the longitudinal axis of the gate. Slots 220 receive guide pins 222 mounted on the inner surface of the wall of housing 216.

A plurality of upwardly extending fingers 224 on gate 218 move into the spaces between the belts 60 when the gate is blocking position. Preferably, the fingers 224 are beveled along one side to permit oblique retracting movement without contacting the belts 60. A suitable biasing means, such as a spring 226 coupled to one end of the gate member 218, normally urges the fingers into a blocking position. A solenoid 228 coupled to the other end of the gate 218 is actuated to move the gate member into a nonblocking or retracted position. By mounting the gate member 218 for movement along a path oblique to the housing 216, as described above, it is possible to arrange the gate assembly linearly, permitting a construction which is both compact and compatible with existing machines.

The original is moved along the platen 20 by the transport belts 60 until the leading edge of the original abuts the gate fingers 224 and further forward movement is prevented. The transport belts 60 then slip relative to the original while at the same time providing a gentle force which aligns the leading edge of the orginal against the fingers if it has become skewed.

With the original now in place, the optical scanning system (not shown) of the copier 12 is actuated to expose a photosensitive surface (not shown) to a light image of the original. When exposure is complete, the solenoid 228 is actuated to retract the fingers 224 from the transport path to allow the original to be returned to the stack 68. A guide 230 having fingers 232 extending rearwardly and upwardly between adjacent belts 60 ensures that the original is separated from the belts and is not carried around the pulley assembly 36. The fingers 232 are recessed in notches (not shown) provided on the underside of guide bar 64. The original is directed by an upwardly curved guide 236 onto the ramp 130 of the support surface 70. For this purpose, pulley assembly 36 is arranged so that the trained portions of the belts 60 are tangent to the surface of the guide 236. A plurality of drive rollers 238 are disposed at a tangent to the inner surface at a location spaced downstream from the belts 60. Belts 60 and rollers 238 engage first and second pluralities of idler rollers 240 and 242, respectively, mounted on the other side of the guide 236. Guide member 236 is provided with slots 244 at suitable locations to permit rollers 240 and 242 to contact belts 60 and rollers 238, respectively. Rollers 238 are mounted on a shaft 245 rotatably received by side panels 22 and 24. A sprocket wheel 246 mounted on the left end of shaft 245 couples shaft 245 to shaft 38. A drive chain 248 couples sprocket wheel 246 to a sprocket wheel 250 mounted on shaft 38. Shafts 252 and 254 mounted between the side panels 22 and 24 rotatably support rollers 240 and 242. A metal strip 255 disposed between rollers 238 and ramp 130 shields the moving parts of the assembly from the operator's fingers.

The combined operation of the feeder assembly 66 and the transport assembly 34 may now be described in some detail. In the discussion that follows, it will be assumed that the optical scanning system of the copier 12 is of a conventional type in which a reciprocating mirror (not shown) is moved through a forward stroke to expose a photosensitive surface (not shown) to a light image of the original on the platen 20 and a return stroke to return the mirror to its initial or "home" position. Before the scanning system is actuated, feeder assembly motor 98 is energized to advance the lowermost original from the stack 68 through the inlet A past the pressure rollers 172. At this point, feeder assembly motor 98 is de-energized, while transport assembly motor 58 and solenoid 192 are energized to move the pressure rollers 172 against drive rollers 170 to move the original along the transport path onto the imaging platen 20. One-way clutches 118 and 120 permit rollers 72 and 92 to be overdriven by rollers 172 and 170. Transport assembly motor 58 remains energized until a short period after the leading edge of the original abuts the fingers of the exit gate 218 to realign the original if it has become skewed.

With the original now in place on the platen 20, the scanning system of the copier 12 is actuated to make a single copy of the original on the forward stroke of the scanning miror. On the return stroke of the scanning mirror, solenoid 228 is actuated to retract the exit gate 218 and transport assembly motor 58 is reactuated to move the original along guide 236 onto the top of the stack 68. Simultaneously with the return of the first original, feeder assembly motor 98 is reactuated to advance a second original through inlet A to feed it to rollers 170 and 172. The operation of assemblies 66 and 34 is now repeated in cyclical fashion, with successive originals being advanced to and returned from the imaging platen 20 during the return stroke of the optical scanner. The operation is continued until all of the originals have been advanced past the imaging platen 20 a number of times equal to the number of sets of copies.

Referring now to FIGS. 8 to 10, I show my sensor, indicated generally by the reference numeral 256, for detecting when the last original, that original initially at the top of the stack 68, has been advanced from the bottom of the stack to the transport assembly 34. The sensor 256 is supported by a mounting plate 258 secured to the right side plate 24 of the transport assembly 34. The sensor 256 includes an L-shaped arm 260 formed from a think metal strip and having an inwardly extending tip 261 at its upper end. Tip 261, initially set on top of the last original, serves as a place marker to follow the progress of that original through the stack 68.

Tip 261 moves along a parallelogram-shaped path, indicated in dot-dash lines in FIG. 9, having a first portion extending through the stack of originals 68 to a point beneath the support surface 70 and a second portion displaced outwardly from the stack. Suitable slots 262 and 264 formed in the side panels 24 and 69 and in the support surface 70, respectively, permit the movement of the tip 261 along the path described. I secure a bracket 270 formed with a closed-loop, parallelogram-shaped slot 272 at its upper end and a pair of elongated vertical slots 274 and 276 at its lower end to mounting plate 258 to guide tip 261 along its path. Slot 272 receives a pin 266 secured to arm 260 near its upper end, while slots 274 and 276 receive a second pin 268 secured to arm 260 at its lower end. Pin 268 extends through slot 276 to receive one end of a link 278, the other end of which is secured to the plunger 280 of a solenoid 282. A feeler 290 of a microswitch 288 is so arranged that the arm 260 engages the feeler 290 to actuate the switch 288 when pin 266 is in its lowermost position in the slot 272.

The operation of the sensor 256 may conveniently be understood by assuming that the tip 261 is resting on the stack of originals 68 in the position indicated by reference character 261a in FIG. 9 with the pin 266 in an intermediate position along the inner portion of the slot 272. As originals are advanced from the bottom of the stack 68 to the transport assembly 34, the tip 261, urged by its own weight and by that of the arm 260 and solenoid plunger 280, advances downwardly to follow the last original. At the same time, copied originals are returned to the stack 68 on top of the tip 261. When the last original is advanced from the feeder assembly 66, the tip 261 drops through the slot 264 to a limit position, indicated by reference character 261b in FIG. 9, determined by the lowermost point of the slot 272, causing arm 260 to actuate the switch 288. Switch 288 provides a signal to the control circuit to be described indicating that the last original has been fed. When the last original is returned to the top of the stack 68, solenoid 282 is actuated to pull the plunger 280 upwardly to move the arm 260 along the outer portion of the parallelogram slot 272. A leaf spring 286 bears against the pin 266 from the entrance side of the lower corner to ensure that the pin is directed outwardly and does not re-enter the inner portion of the slot 272. When the pin 266 reaches the upper corner of the slot 272, bringing pin 261 to position 261c, a second leaf spring 284 bears against the pin 266 from the entrance side of the corner to direct the pin along the slanted portion of the slot to cause the tip 261 to move downwardly upon the stack 68. The tip 261 then continues to follow the last original through the stack in the manner described above.

Referring now to FIGS. 11 to 13, the output tray assembly of the copier 12, indicated generally by the reference character 300, includes a tray 302 supported by a bearing block 304 for rotation on a vertical axis near the copier 12 along the midline of the tray 302. I secure bearing block 304 to a copier frame portion 306 which is on the right side of the copier 12 in the embodiment shown by any suitable means such as bolts 308. Opposing feed rollers 320 and 322 are arranged on respective shafts 321 and 323 to deliver a copy 318 from the copier 12 to the tray assembly 300. I form the tray 302 with upstanding sidewalls 310 and 312 which diverge outwardly in the direction away from the copier 12 at an angle of about $7\frac{1}{2}°$. I also form the tray 302 with end walls 314 and 316 adjacent to the copier 12 which are perpendicular to respective sidewalls 310 and 312.

When the tray is rotated on its vertical axis to a first position 302', sidewall 312 is perpendicular to the right side wall of the copier 12, while end wall 316 is parallel to the copier wall. Similarly, when the tray 302 is rotated in the opposite direction to a second position 302", sidewall 310 is perpendicular to the wall of the copier 12, while end wall 316 is parallel to the copier wall. Thus, a copy 318 discharged from the copier 12 through feed rollers 320 and 322 when the tray is in the position 302' will be stacked against walls 316 and 312, while, similarly, a copy discharged from the feed rollers 320 and 322 when the tray is in position 302" will be stacked against the walls 314 and 310. Shifting the position of the tray from position 302' to position 302" or vice versa between successive sets of copies offsets successive sets of copies so as to permit their ready separation from one another. Preferably the tray portion 324 remote from the copying machine 12 is inclined upwardly away from the machine to bias the copies against the end walls 314 and 316. If desired, the tray 302 may be formed with sets of ridges 326 and 328 parallel to the respective sidewalls 310 and 312 to prevent the stacked copies from slipping or shifting.

A motor 330 mounted on a bracket 332 secured to the bearing block 304 shifts tray 302 between positions 302' and 302". The motor shaft carries an eccentric 334 pivotally coupled to one end of a link 336. The other end of the link 336 is pivotally coupled to a bracket 338 secured to the underside of the tray 302. I so adjust the coupling between the bracket 338 and the eccentric 334 that the eccentric moves the tray 302 to the extreme positions 302' and 302" in the course of its rotation. Depending portions 340 and 342 secured to end walls 314 and 316 actuate limit switches 344 and 346 when the tray 302 is in the extreme positions 302' and 302", respectively.

Referring now to FIG. 16, I show an exemplary control circuit for my automatic feeder. Before making any copies, the operator activates a suitable selector circuit 352 to load a signal representing the number of sets of copies desired into a digital counter 353. Counter 353, which counts down one in response to a positive-going signal supplied to a clock pulse (CP) input, provides an AND gate 354 with a 1 or "high" logic signal whenever the count is greater than zero. After placing a stack of originals face up to the support surface 70, the operator momentarily closes a "print" switch 355 to initiate the copying cycle. Closure of switch 355 supplies a "high" logic signal from a line 356 to one input of an OR gate 357 to provide a 1 or "high" logic signal to the other input of AND gate 354. AND gate 354 then sets an RS-type flip-flop 358 to logic level 1 to provide a "high" output to a noninverting power amplifier 359. Amplifier 359 drives a coil of a single-pole normally open relay 360 to connect the feeder assembly motor 98 between AC supply lines 361 and 362. Closure of print switch 355 also provides a 1 logic signal to one input of an OR gate 363. Gate 363 in turn energizes reset solenoid 282 through a noninverting power amplifier 364 to move the sensor tip 261 from the initial position 261b shown in FIG. 9 beneath the stack of originals 68 to a position 261a in which the tip 261 rests on the uppermost original.

In the manner described previously, motor 98 drives feed rollers 72 and 92 to advance the lowermost original in the stack 68 through the inlet A until the leading edge of the original moves an arm 347, shown in FIG. 14, supported by a pivot 348 and disposed just beyond the pressure rollers 172, against the feeler of a microswitch S1. Closure of switch S1 applies a positive voltage from line 356 to one input of an OR gate 365 to provide a high, or positive, input to a noninverting power amplifier 366. Amplifier 366 drives the coil of a double-pole normally open relay 367 which controls both the transport assembly motor 48 and the solenoid 192. As a result, the belts 60 of the transport assembly are driven while, simultaneously, fingers 160 are retracted and pressure rollers 172 are moved into engagement with the original to move it along the transport path. A delay circuit 368 coupled between switch S1 and the reset (R) input of flip-flop 358 delays the trailing edge of the switch signal so that, a short time interval after the switch S1 is closed, flip-flop 358 is reset to provide a 0 or "low" logic output, disabling feeder motor 98.

As the leading edge of the original moves beyond rollers 170, it engages one end of a pivot arm 349, shown in FIGS. 14 and 15, supported by a pivot 350 carried by a bracket 351 near the lower end of the guide 150. As a result, the other end of the arm 349 moves upwardly to trip the feeler of a microswitch S2 also carried by bracket 351. The potential from line 356 is applied through switch S2 to a second input to OR gate 365 so that the motor 58 and the solenoid 192 remain energized after the trailing edge of the original has moved past switch S1. Switch S2 is also coupled to the input of a delay circuit 369 to provide an output with a delayed trailing edge to a third input to OR gate 365.

OR gate 365 thus remains at logic level 1 for a short time after the trailing edge of the original has cleared switch S2 to ensure that the belts 60 move the leading edge of the original against the fingers 224 of the exit gate 218. After a short time interval, delay circuit 369 provides a 0 output to OR gate 365, disabling the transport assembly motor 58 and the solenoid 192. The output of OR gate 365 is also applied through a logic inverter 370 to a one-shot multivibrator 371. When motor 58 and solenoid 192 are disabled, one-shot multivibrator 371 provides a pulse.

The pulse from multivibrator 371 is used to signal the scanning control circuit of the copier 12 that the first, or initially lowermost, original is in place on the imaging platen 20 and that copying cycle may now start. In the scanning control circuit, electrically actuated forward and reverse clutches 372 and 373 control the forward and return motion, respectively, of a reciprocating optical scanner (not shown) of a type known in the art. A home switch 374 having one terminal coupled to line 356 is closed whenever the scanner is in a quiescent, or home, position, while a return switch 375 also having one terminal coupled to line 356 is closed whenever the scanner is at the opposite extreme from its home position. A first RS flip-flop 376 controls forward clutch 372 through an amplifier 377 while a second RS flip-flop 378 controls reverse clutch 373 through an amplifier 379.

Initially, both of the flip-flops 376 and 378 are off so that 1 logic signals from the inverted flip-flop outputs produce a 1 signal from the output of an AND gate 380. When multivibrator 371 produces a pulse in the manner described above, both inputs to AND gate 381 are high, causing OR gate 382 to provide a set signal to flip-flop 376, energizing the forward clutch 372. During the forward stroke of the scanner, the photosensitive surface (not shown) of the copier is exposed to the original in position over the imaging platen 20. When, after exposure is complete, the scanner reaches the end of its forward stroke, return switch 375 is momentarily closed to reset flip-flop 376, de-energizing forward clutch 372. Simultaneously, flip-flop 378 is set, energizing reverse clutch 373 and initiating the return stroke. Upon reaching its home position at the end of the return scanning stroke, the scanner momentarily actuates home switch 374, resetting flip-flop 378 and setting flip-flop 376 through AND gate 383. Inverter 384, responsive to AND gate 380, prevents flip-flop 376 from being set through AND gate 383 prior to the initial pulse from multivibrator 371.

During the first and each succeeding return stroke of the scanner except the last, the original just copied is returned to the top of the stack 68 while a new original is advanced from the bottom of the stack 68 to the imaging platen 20. To this end, momentary closure of return switch 375 at the beginning of the return stroke provides pulse inputs to OR gates 357 and 385. As a result, flip-flop 358 is again set to energize the feeder motor 98 to advance a second original from the stack 68. At the same time, OR gate 385 drives the input of a power amplifier 386 coupled to a normally open relay 387. The contacts of relay 387 are coupled to the exit gate solenoid 228. OR gate 385 also drives one input of an OR gate 388 directly and another input through a further delay circuit 389. Gate 388 drives a relay 390, controlling transport assembly motor 58, through an amplifier 391.

Thus, when the return scanning stroke begins, the exit gate 218 is retracted to permit further movement of the first original along the transport path while motor 58 is energized to drive the transport belts 60. Switch 375 continues to supply the pulse to OR gate 385 for a sufficient period of time to allow the leading edge of the first original to trip an exit switch S3 disposed just beyond the exit gate 218. When the first original trips switch S3, the potential from line 356 is applied through the switch to a second input to OR gate 385 so that the motor 58 and the solenoid 228 remain energized.

Switch S3 is coupled through a delay circuit 392 to a third input of OR gate 385. Circuit 392 delays the negative-going edge of its input so that, a short period after the trailing edge of the first original clears switch S3, the output of delay circuit 392 changes to zero to produce a zero output from OR gate 385. As a result, solenoid 228 is disabled. Motor 58 remains energized, however, since by this time the second original has advanced far enough to trip microswitch S1 in the manner described before. Delay circuit 392 has a time constant such that, by the time its output changes to zero, the trailing edge of the first original has cleared the exit gate 218, but the leading edge of the second original has not yet reached that point. Motor 58 thus advances the second original into place for copying while at the same time returning the first original to the top of the stack 68.

The control circuit also includes means for stopping the transport assembly if a document has become jammed along the transport path. More particularly, switch S3 is coupled to one input of an AND gate 392a directly and to another input of AND gate 392a through a delay circuit 393 which delays the leading edge of its input by one second. If an original depresses the feeler of switch S3 for more than one second, indicating that the document is jammed, both of the inputs to AND gate 392 will become positive, producing a positive output from OR gate 394. OR gate 394 is coupled to the input of a noninverting power amplifier 395, the output of which drives a single-pole normally closed relay 396. Relay 396 opens the line controlling solenoids 192 and 228 and motors 58 and 98, bringing the transport assembly to a stop.

In a similar manner, switch S1 is coupled directly to one input of an AND gate 397 and to the other input of AND gate 397 through a one-second delay circuit 398 similar to circuit 393. If an original depresses the feeler of switch S1 for more than one second, indicating that the document has become jammed, both of the inputs of AND gate 397 become positive, producing a positive output from OR gate 394 to energize relay 396 and open the motor and solenoid control circuit.

When the last, or initially uppermost, original of the stack 68 is advanced from the feed assembly 66, the hook 260 drops through the slot 264 in the support surface to close switch 288. Switch 288 supplies a signal to one input of an AND gate 399 also responsive to a delay circuit 400 coupled to one-shot multivibrator 371. AND gate thus indexes counter 353 by one at about the middle of the reverse scanning stroke.

Switch 288 also feeds one input of an AND gate 401, the output of which clocks a two-bit binary counter 402. A line from multivibrator 371 feeds the other input of AND circuit gate to cause counter 402 to count whenever OR circuit 365 changes to zero after an original is fed to the platen. After two such counts, with the last original returned to the top of the stack 68, counter 402 provides a 1 signal to both inputs of an AND gate 403 to energize reset solenoid 282 through OR gate 363 and power amplifier 364. After the hook 260 has been set down on top of the stack 68, AND gate 403 resets counter 402 through a delay circuit 404 to de-energize solenoid 282.

When reset solenoid 282 is energized, OR circuit 363 also sets an RS flip-flop 405. Flip-flop 405 is reset at the beginning of the next return scanning stroke by a signal from return switch 375, at which point the copier 12 is about to discharge a copy of the first, or initially lowermost, original through feed rollers 320 and 322. Upon being reset, the inverted output of flip-flop 405 provides a positive-going signal to a one-shot multivibrator circuit 406. One-shot circuit 406 in turn provides a pulse to an OR gate 407 to drive a normally open relay 408 through a power amplifier 409. Closure of relay 408 energizes the output tray motor 330.

Assuming that the output tray is initially in position 302', one-shot circuit 406 continues the pulse for a sufficient time to allow the motor 330 to rotate the tray 302 away from switch 344, reopening it to remove the voltage on line 356 from an input to a NOR gate 410. NOR gate 410 thereafter provides a 1 signal to OR gate 407 so that motor 330 continues to rotate the tray 302 until it reaches position 302". At this point, actuator 342 bears against the feeler of switch 346 to close it to recouple line 356 to one input of NOR gate 410 and thereby disable the motor 330. When the last original is next fed from the bottom of the stack 68, motor 330 rotates the tray 302 from position 302" back to 302', the roles of the switches 344 and 346 being interchanged.

The process as described above is repeated until the desired number of sets of copies have been made. When the last original is fed to the imaging platen to make a copy for the last set, counter 353 counts to zero and disables AND gate 354 so that the feed motor 98 and the reset solenoid 282 remain unactuated on the next return scanning stroke when the last original is returned to the stack 68. On that return scanning stroke, transport motor 58 remains energized for a period of time, determined by delay circuits 392 and 389, sufficient to return the last original to the stack 68. One-shot multivibrator 371 does not produce a pulse during the return stroke, as intake switches are not actuated. As a result, counter 402 remains unpulsed and solenoid 282 does not reset the end of stack sensor arm 260. At the completion of the return scanning stroke, switch 374 closes to reset flip-flop 378, but does not set flip-flop 376, owing to the absence of a signal from counter 353. Thus, at the end of the final return stroke, both of clutches 372 and 373 become deactuated.

If the feeder assembly 66, the underlying transport assembly 34, and the copier 12 are manufactured as separate units, certain portions of the control circuit shown in FIG. 16 are advantageously housed separately with their associated apparatus. Thus, components 352–354, 357–360, 363–364, 368, and 399–404 are naturally associated with the feeder assembly 66, while components 365–371 and 385–398 are naturally associated with the transport assembly 34. Suitable interconnections and any additional components necessary for manual or semi-automatic operation will be apparent to those skilled in the art.

Referring now to FIGS. 17 and 18, I show a modified form of the feeder assembly 66 in which shaft 74 supports a pair of feeder rollers 422, the peripheral surfaces of which are formed with flats at 60° angular intervals. I form rollers 422 from a high-friction material such as polyurethane. By shaping the feeder rollers 422 in this manner, I combine a jogging action with the feeding action, lessening the chance that more than one original will be advanced. A one-way clutch 436 couples rollers 422 to shaft 74 to permit rollers 422 to be over-driven by the transport assembly 34. Upper shaft 80 supports a pair of retarding rollers 424 outboard of the feeder rollers 422. I form rollers 424 from a relatively lower friction material such as neoprene or a lower friction polyurethane than that of which rollers 422 are formed. Like the retarding rollers 78 shown in FIG. 4, retarding rollers 424 are substantially wider than feeder rollers 422 to minimize undesirable abrasion of the leading edges of the originals in the stack 68. Preferably, rollers 424 and the unflattened portions of rollers 422 have a slight radial overlap of 0 to 0.004 inch. Retarding rollers 424 have beveled inner edges to provide clearance for the sheets.

Upper shaft 80 also supports a low-friction guide roller 426 between feeder rollers 422. Guide roller 426 overlaps feeder rollers 422 radially to corrugate the original being fed and to ensure engagement with the rollers 422. Lower shaft 74 supports a pair of low-friction guide rollers 428 outboard of feeder rollers 422. Guide rollers 428 have a radial clearance from the retarding rollers 424 greater than the thickness of a single original but less than that of two originals (preferably 0.005 to 0.006 inch) and are movable axially along the shaft 74 to adjust the retarding force exerted by rollers 424. Preferably for this purpose, guide rollers 428 are at least as wide as retarding rollers 424.

A comb 430 attached to the fixed cover 128 and having rearwardly extending teeth 432 prevents originals from piling up against the retarding rollers 424. Preferably, the teeth are L-shaped as shown in FIG. 18 and have beveled lower leading edges 434 to ensure a smooth feeding of the originals from the stack 68.

Figure 20:
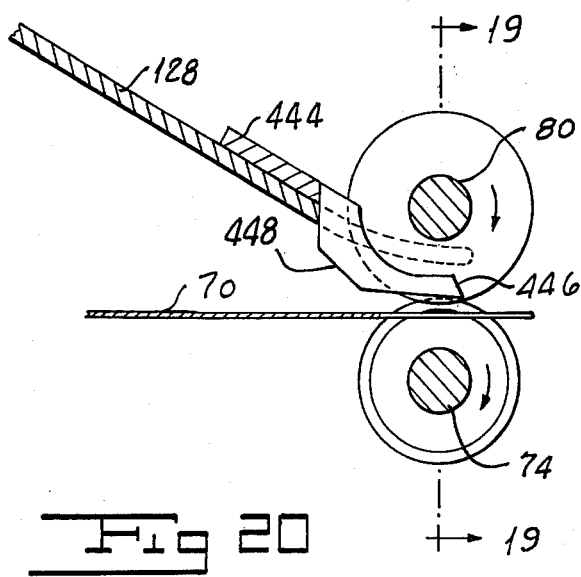
FIG. 20 is a fragmentary section of the assembly shown in FIG. 19, taken along line 20—20.

In FIGS. 18 and 20, I show another modified form of the feeder assembly 66 in which shaft 74 supports a pair of relatively wide feeder rollers 438. Preferably, the working surfaces of rollers 438 comprise Neoprene with a durometer hardness of 30. A relatively low-friction roller 440 mounted on the upper shaft 80 between rollers 438 corrugates the leading edges of the originals being fed to ensure engagement with the rollers 438. Preferably, roller 440 comprises Delrin and overlaps the rollers 438 radially by about 0.03 inch. Finally, I mount a pair of retarding rollers 442 on the upper shaft 80 outboard of the feeder rollers 438. Preferably, rollers 442 comprise Hypalon with a durometer hardness rating of about 60 and have working surfaces which taper inwardly at an angle of about 2.5° as shown in FIG. 19.

In the embodiment shown, the axial clearance between rollers 442 and 438 is about 0.03 inch, while the radial overlap between the same rollers is about 0.01 inch. Rollers 442 assist the inner guide roller 440 in pressing the leading edge of the lowermost original against the feeder rollers 438. Rollers 438 are provided with one way clutches (not shown) similar to the clutches used with rollers 72 and 422 to permit overdrive when the transport assembly 34 takes over. A comb 444 attached to the fixed cover 128 and having rearwardly extending teeth 446 prevents originals from piling up against the retarding rollers 442. Preferably, the teeth 446 have beveled lower leading edges 448, similar to the edges 434 shown in FIG. 18, to ensure smooth feeding of the originals from the stack 68.

It will be seen that I have accomplished the objects of my invention. My feeder results in automatically collated multiple sets of copies while using only a single original document supply station. My feeder also has a relatively rapid recycling rate and is especially adapted for use with a copier having moving optics for scanning a stationary original. Further, my feeder automatically feeds originals to the copier a preset number of times without using manually inserted place-marking sheets or relatively complicated automatic mechanisms. Finally, I have provided a copy tray which permits the ready identification and separation of multiple sets of copies.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefor, to be understood that my invention is not to be limited to the specific details shown and described.

Having thus described my invention, what I claim is:

1. In a sheet feeder in which sheets are separated from one side of a stack and returned to the other side of the stack, said feeder having a place-marking element and means for automatically setting said element against the sheet on the other side of said stack, the improvement wherein said automatic setting means comprises means for mounting said element for movement along either of two paths between a first point on said one side of said stack and a second point on said other side of said stack, one of said paths extending through the space occupied by said stack and the other of said paths being a return path not extending through said space, said mounting means comprising a pin secured to said place-marking element and means for forming an endless elongated slot for receiving said pin, said element being normally subject to a biasing force in the direction of said first point along the lengths of each of said paths and at the end of said paths, and means for applying an actuating force in a direction opposing said biasing force to move said place-marking element from said first point to said second point and then removing said actuating force to permit said element to move under the influence of said biasing force back to said first point.

2. Apparatus as in claim 1 in which said mounting means further comprises a second pin secured to said place-marking element and means for forming an elongated slot for receiving said second pin.

3. Apparatus as in claim 1 in which said endless elongated slot forms a parallelogram having a first pair of sides generally perpendicular to the faces of said sheets and a second pair of sides oblique to the faces of said sheets.

4. Apparatus as in claim 1 in which said endless elongated slot comprises a first slot portion for guiding said place-marking element along said one path and a second slot portion for guiding said element along said return path, said first slot portion forming angular corners with said second slot portion, said mounting means further comprising means for permitting only unidirectional movement around said corners.

5. Apparatus as in claim 4 in which said unidirectional movement means comprises resilient members arranged to bear against said pin along the entrance sides to said corners.

6. Apparatus as in claim 5 in which said resilient members comprise leaf springs.

7. In a sheet feeder in which sheets are fed one by one from one side of a stack and are returned to the other side of the stack, apparatus including a support on which said stack is adapted to rest, a place-marking element, means mounting said element in engagement with the uppermost sheet in said stack and for movement with said sheet downwardly toward said support as sheets are fed from said stack, said mounting means comprising a pin secured to said place-marking element and means for forming an endless elongated slot for receiving said pin, means forming an opening in said support in the path of movement of said element, and means responsive to movement of said element through said opening for first moving said element out of alignment with said stack and then moving said element in the direction of said stack and finally moving said element back into engagement with the uppermost sheet in said stack.

8. Apparatus as in claim 7 in which said mounting means further comprises a second pin secured to said place-marking element and means for forming an elongated slot for receiving said second pin.

9. Apparatus as in claim 7 in which said endless elongated slot forms a parallelogram having a first pair of sides generally perpendicular to the faces of said sheets.

10. Apparatus including in combination means adapted to be actuated to make copies of originals presented to a copying station, means for holding a stack of originals to be copied, means for successively feeding each original from said stack to said copying station in a recirculating manner a predetermined number of times to make the desired number of sets of copies, means operating synchronously with said feeding means for actuating said copying means to make copies of said originals fed to said copying station, means for sensing each successive circulation of the entire stack of originals, a copy tray for holding said copies, means for delivering copies from said copying means to said copy tray along a path having a center line, and means responsive to said sensing means for rotating said copy tray about an axis passing adjacent said center line to offset successive sets of copies to permit the separation thereof.

11. Apparatus as in claim 10 in which said rotating means alternatingly rotates said copy tray between first and second positions.

12. Apparatus as in claim 10 in which said rotating means alternatingly rotates said copy tray between first and second positions angularly spaced about 15°.

13. Apparatus as in claim 10 in which said copy tray includes upstanding sidewalls for containing the sets of copies received in respective first and second positions of said tray, said upstanding sidewalls diverging from each other along said path.

14. Apparatus as in claim 10 in which said copy tray further includes a pair of end walls extending generally transversely of said path but angularly displaced from each other.

15. Apparatus as in claim 14 in which a portion of said copy tray slopes upwardly along said path to bias said copies toward said end walls.

16. Apparatus as in claim 10 in which at least a portion of said copy tray is inclined upwardly along said path.

17. Apparatus as in claim 10 in which said copy tray includes means for preventing lateral movement of copies on said tray relative thereto.

18. Apparatus as in claim 10 in which said rotating means includes means for supporting said copy tray for movement around a generally vertical axis, a shaft having an eccentric mounted thereon, a link arm coupling said copy tray and said eccentric, and means for rotating said shaft.

* * * * *